United States Patent [19]
Bang

[11] Patent Number: 5,456,164
[45] Date of Patent: Oct. 10, 1995

[54] KIMCHI FERMENTATION OR COOL STORAGE SYSTEM USING A THERMOELECTRIC MODULE

[75] Inventor: Joong Cheol Bang, Taegu, Rep. of Korea

[73] Assignee: Donghwan Ind. Corp., Changwon, Rep. of Korea

[21] Appl. No.: 370,600

[22] Filed: Jan. 10, 1995

[51] Int. Cl.⁶ .............................. A23B 7/00; F25B 29/00; C12H 1/00
[52] U.S. Cl. .................................. 99/468; 99/476; 99/486; 99/470; 62/440
[58] Field of Search .................. 99/468, 470, 483, 99/486, 331, 276, 451, 467, 472, 476; 62/157, 158, 161, 162, 164, 231, 186, 187, 281, 441, 440; 165/13, 30; 435/289–291, 313, 316; 426/49, 52, 615; 220/203, 208, 209, 322, 756, 760, 769

[56] References Cited

U.S. PATENT DOCUMENTS

| | | | |
|---|---|---|---|
| 3,937,227 | 2/1976 | Azumano | 34/225 |
| 4,459,825 | 7/1984 | Crouch | 62/440 |
| 4,537,034 | 8/1985 | Crouch | 62/78 |
| 5,142,969 | 9/1992 | Chun | 99/468 |
| 5,336,516 | 8/1994 | Yamamoto et al. | 426/615 |
| 5,337,910 | 8/1994 | Picozza et al. | 220/203 |
| 5,351,745 | 10/1994 | Park | 165/30 |
| 5,388,427 | 2/1995 | Lee | 62/441 |
| 5,392,615 | 2/1995 | Lim | 62/414 |
| 5,398,599 | 3/1995 | Woo | 99/476 |
| 5,402,709 | 4/1995 | Carron et al. | 99/468 |
| 5,411,328 | 5/1995 | You | 62/441 |

Primary Examiner—Timothy F. Simone
Attorney, Agent, or Firm—David H. Semmes

[57] ABSTRACT

A Kimchi fermentation or cool storage apparatus comprises a chamber for either fermenting or coolly storing Kimchi, the chamber being formed of a hollow barrel with opened upper end; a cover for either entering or enclosing the chamber; a thermoelectric module for heating or cooling the chamber, the thermoelectric module being mounted on the outside of the bottom wall of the chamber; a power supplying section for supplying electric power with the thermoelectric module; a temperature sensing section for sensing the interior temperature of the chamber; and, a microprocessor for receiving the temperature signal from the temperature sensing section, for controlling the power supplying section to keep the chamber at a reference fermentation temperature for a predetermined time duration while fermenting Kimchi, and keep the chamber at a reference storage temperature while coolly storing Kimchi.

15 Claims, 4 Drawing Sheets

KIMCHI FERMENTATION OR COOL STORAGE SYSTEM USING A THERMOELECTRIC MODULE

BACKGROUND OF THE INVENTION

1. Field of the Invention

The present invention is related to a food fermentation or cool storage system using a thermoelectric module, and particularly to a food fermentation or cool storage system which is designed to ferment or coolly store foods such as Kimchi by the heat generation or heat absorption phenomenon occurred when electric current flows through the thermoelectric module.

2. Description of the Prior Art

Kimchi is a traditional Korean naturally fermented foods which is made of radish, cabbage or cucumber, spiced with pepper, garlic, onion, ginger, and so on. Some researches explain that a temperature condition is the most important thing in optimal fermentation or storage of Kimchi, and Kimchi has a best taste at an acidity between PH 4.2–4.5. This acidity level may be obtained by leaving Kimchi at a temperature of 68°–77° F. for about 40 hours. In addition, it is well known that an optimal temperature at which the taste of Kimchi may last long without change in the acidity level is about 33.8° F.

Conventionally, Kimchi just prepared is either forcibly fermented by heating means such as an electric heater or naturally fermented by leaving it out of the house.

However, the conventional fermentation manners have a problem in that Kimchi cannot fermented to a wanted degree because of difficulties in maintaining the accurate fermentation temperature and time duration.

Furthermore, there has another problem in that the available space of the refrigerator becomes less and unpleasant smell penetrates the whole refrigerator because Kimchi, optimally fermented, should be stored in a refrigerator. Moreover, it is difficult and time-consuming to take a Kimchi container, which is heavy due to the self weight of Kimchi, in or out of the refrigerator, thereby wasting the cool air thereof and increasing the power consumption in the refrigerator.

Furthermore, there is no suitable means for coolly storing Kimchi except for a refrigerator. Accordingly, there is a difficulty in that Kimchi container should be stored in a box filled with ice in order to have fresh Kimchi at picnic.

SUMMARY OF THE INVENTION

The present invention is contrived to solve the aforementioned problems, therefore, an object of the present invention is to provide an apparatus capable of optimally fermenting or coolly storing Kimchi by simple configuration using thermoelectric module as a heating or cooling means.

It is another object of the present invention to provide a Kimchi fermentation or cool storage apparatus using thermoelectric module, which can optimally ferment Kimchi and then automatically store it at a cool circumstance.

It is still another object of the present invention to provide a Kimchi fermentation or cool storage apparatus using thermoelectric module, which occupies small space to be disposed at a proper place in a house.

It is still another object of the present invention to provide a Kimchi fermentation or cool storage apparatus using thermoelectric module, which can ferment or coolly store Kimchi using the electric power supply of an automobile.

To achieve these and other objects, a thermoelectric module, which is made by applying Peltier effect, is preferably used as a means for heating or cooling Kimchi. As well known, Peltier effect is a phenomenon that one conductor generates some heat, not Joule heat, whereas other conductor absorbs some heat when electric current flows through the contact surface of two different conductors (or semiconductors). On the contrary, when the direction of electric current flowing through the contact surface is reversed, the heat generation and absorption is also reversed.

The Kimchi fermentation or cool storage apparatus according to the present invention comprises a chamber for either fermenting or coolly storing Kimchi, the chamber being formed of a hollow barrel with opened upper end; a cover for either entering or enclosing the chamber; a thermoelectric means for heating or cooling the chamber, the thermoelectric means being mounted on the outside of the bottom wall of the chamber; a means for supplying electric power with the thermoelectric means; a means for sensing the interior temperature of the chamber; and, a means for receiving the temperature signal from the temperature sensing means, for controlling the power supplying means to keep the chamber at a reference fermentation temperature for a predetermined time duration while fermenting Kimchi, and keep the chamber at a reference storage temperature while coolly storing Kimchi.

In the afore-mentioned configuration, it is preferable to sheathe the exterior surface of the chamber with a heat insulation member such as polyurethane resin.

In addition, a heat conducting member, preferably formed of a metallic plate, may be interposed between the bottom wall of the chamber and the thermoelectric means to evenly conduct the heat generated from the thermoelectric means to the bottom wall of the chamber.

In addition, silicon compound is preferably stuffed between the thermoelectric means and the heat conducting member to further close adhesion therebetween, and a heat insulation member is preferably wound around the peripheral surface of heat conducting member.

In addition, a heat radiating plate is preferably attached to the opposite surface of the thermoelectric means to further the radiation of unwanted heat, moreover a fan means is arranged in the vicinity of the heat radiating plate to forcibly discharge unwanted heat generated from the opposite surface of the thermoelectric means.

Furthermore, the Kimchi fermentation or cool storage apparatus may comprise a function selecting section for selecting a plurality of functions, such as fermentation speed, fermentation level, the kind of Kimchi or the like. At the same time, the microprocessor may control the power supplying means based on a reference fermentation temperature and time duration corresponding to the respective function.

In addition, the Kimchi fermentation or cool storage apparatus may further comprise a displaying section for displaying the operation state of the apparatus, and an appropriate malfunction preventing section for preventing same voltage level from being concurrently applied to both electric terminals of the thermoelectric means.

Finally, the Kimchi fermentation or cool storage apparatus may further comprise a temperature sensing section for sensing exterior temperature of the chamber, and the microprocessor may calculate a difference between the interior and reference temperatures and a difference between the interior and exterior temperature, and then control the power supplying means to vary the electric power supplied to the thermoelectric means based on the differences.

BRIEF DESCRIPTION OF THE DRAWINGS

The present invention will become more readily apparent from the following description in connection with the accompanying drawings wherein.

DETAILED DESCRIPTION OF THE PREFERRED EMBODIMENT

For a better understanding of the present invention, together with other and further objects, advantages and capabilities thereof, reference is made to the following disclosure and appended claims in connection with the above-described drawings.

Figure 1:
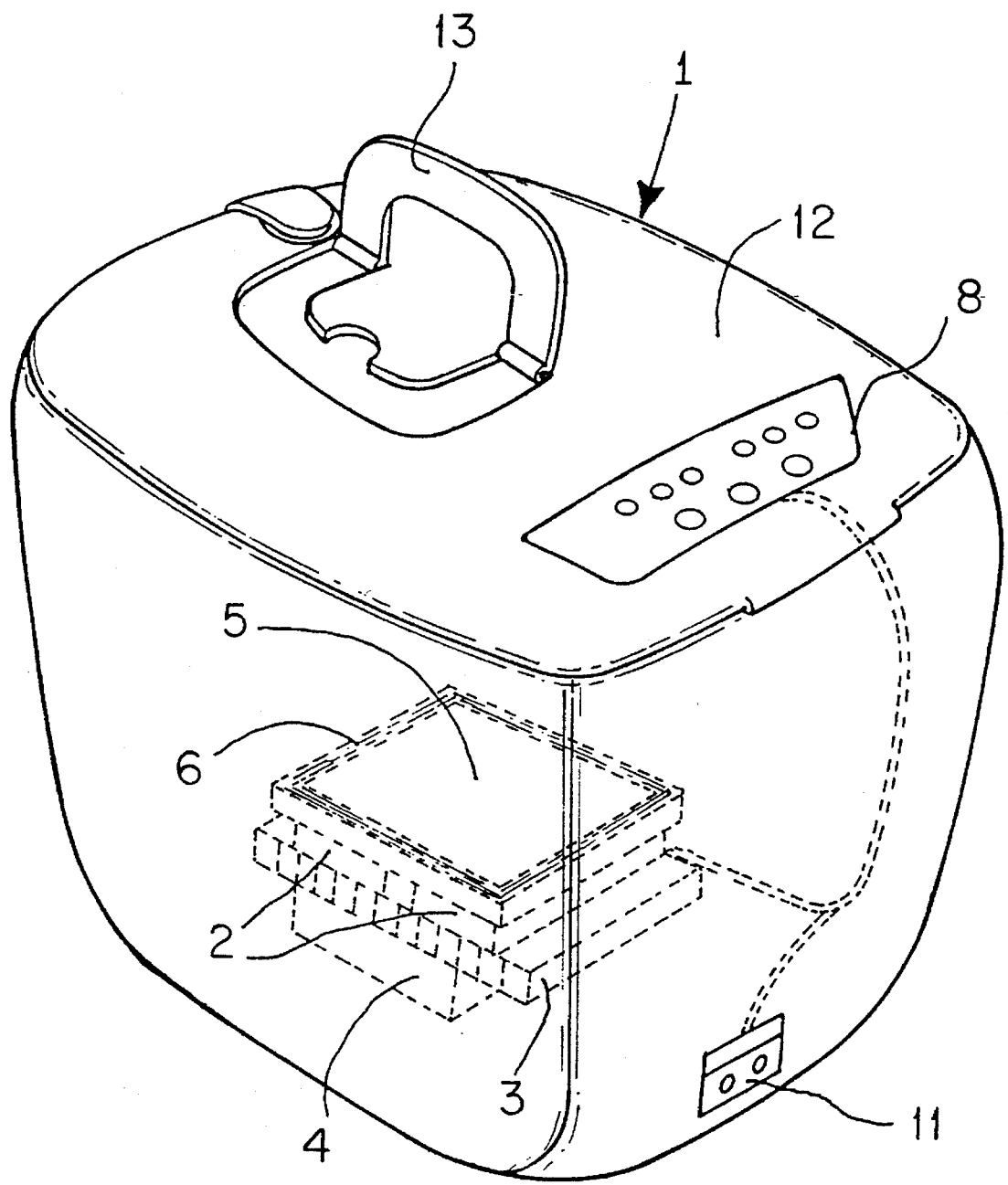
FIG. 1 is a perspective view of a Kimchi fermentation or cool storage apparatus according to the present invention.
Figure 2:
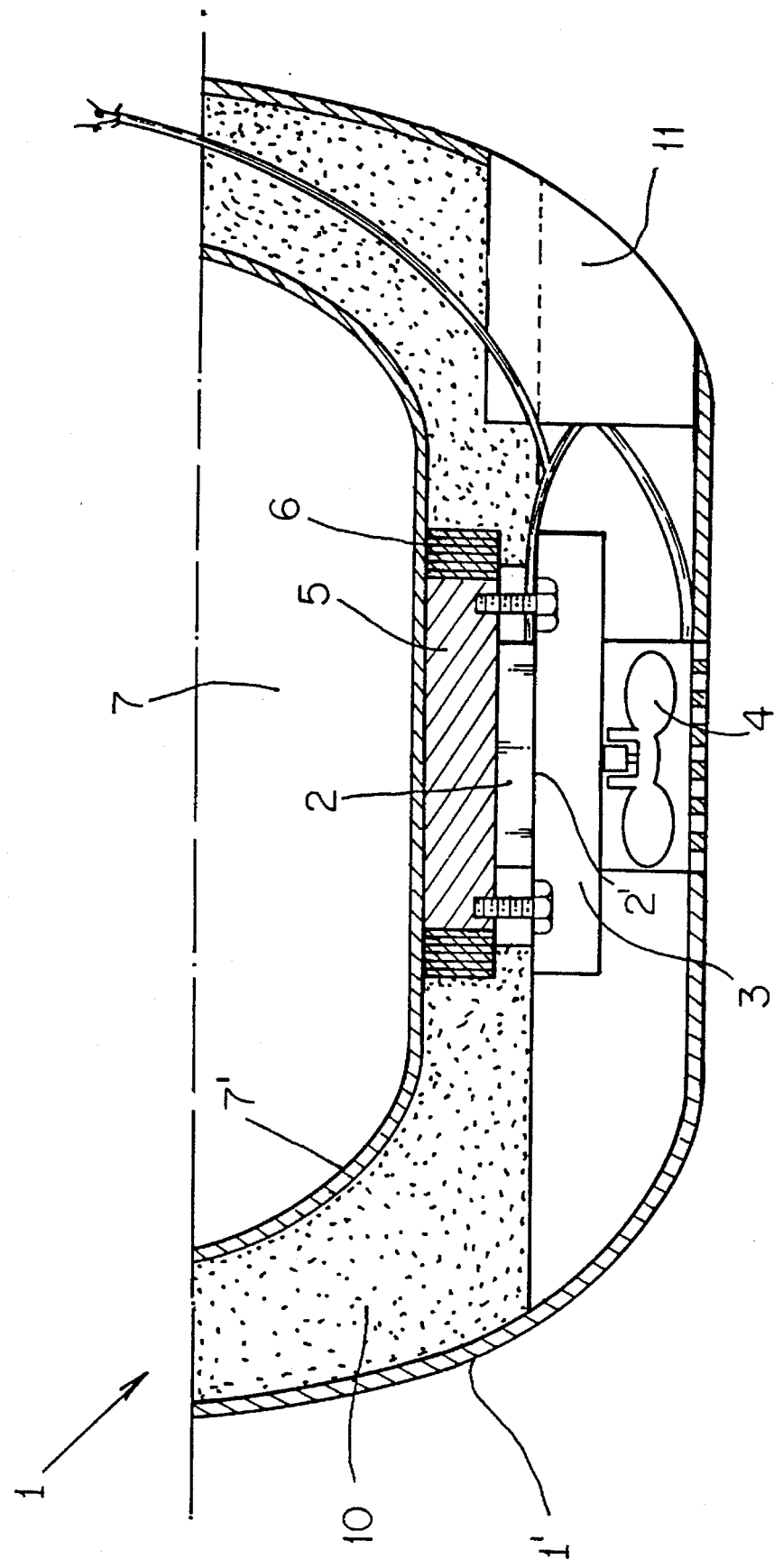
FIG. 2 is a cross sectional view showing a part comprising thermoelectric module.

Referring to FIGS. 1 and 2, which show the mechanical construction of the Kimchi fermentation or cool storage apparatus, a chamber 7 for fermenting or coolly storing Kimchi is disposed in a housing 1, and a thermoelectric module 2 acted as a heating or cooling means is mounted on the bottom wall of the chamber 7 via a heat conducting block 5 in the space defined by the exterior and interior walls 1' and 7' of the chamber 7. The heat conducting block 5 is made of a metal, for example, aluminum. The thermoelectric module 2 and heat conducting block 5 are securely coupled by bolt members. Polyurethane resin 10 is stuffed in the remaining space defined by the exterior and interior walls 1' and 7' of the chamber 7 to thermally insulate the chamber 7. Silicon compound is stuffed between the thermoelectric module 2 and the heat conducting block 5 to further close adhesion therebetween. A ceramic sheet (not shown), which is innoxious to a human body, is coated on the interior wall 7' of the chamber 7. In addition, a heat insulation tape 6 is wound around the peripheral surface of the heat conducting block 5 with 20–30 turns. A cover 12, whose edge is packed with silicon resin to securely enclose the chamber 7, is rotatably mounted on the upper end of the housing 1. A control panel 8 which has various function keys and displaying elements is disposed on the cover 12.

On the other hand, a heat radiating plate 3 is attached to the opposite surface of the thermoelectric module 2 to further the radiation of unwanted heat, and a electric fan for forcibly discharging unwanted heat generated from the opposite surface of the thermoelectric module 2 is arranged in the vicinity of the heat radiating plate 3.

In FIGS. 1 and 2, reference numeral 11 denotes a connector for power supply, and 13 denotes a handle.

Hereinafter, an electrical construction of the Kimchi fermentation/cool storage apparatus will be explained in detail.

Figure 3:
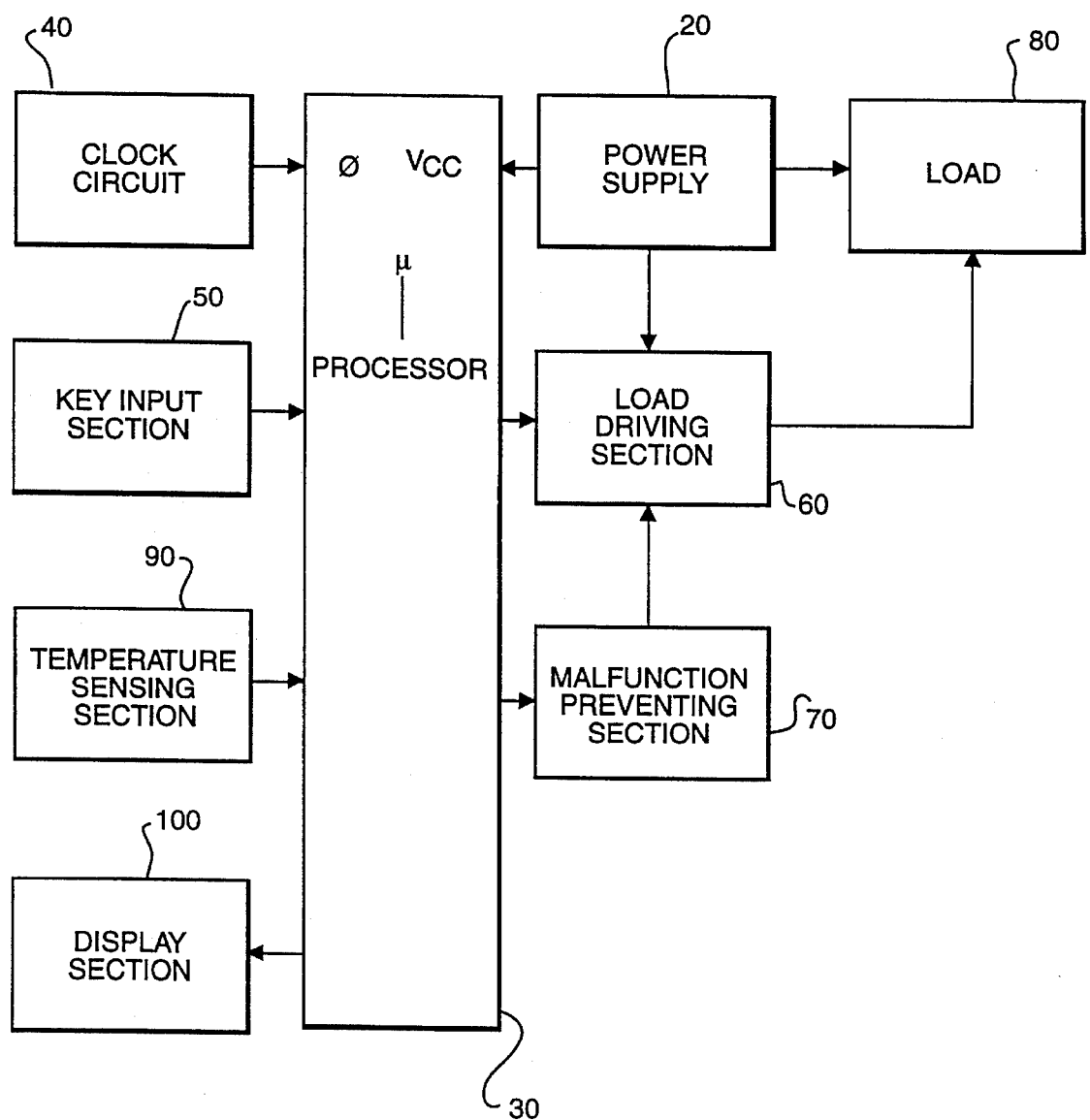
FIG. 3 is a electrical block diagram of a Kimchi fermentation or cool storage apparatus according to the present invention; and, FIGS. 4 is a concrete circuit diagram of a Kimchi fermentation or cool storage apparatus according to the present invention.

Referring to FIG. 3, the Kimchi fermentation/cool storage apparatus comprises a microprocessor 30 for controlling the whole operations of the apparatus, a clock circuit 40 for providing a clock for synchronism to the microprocessor 30, a load section 80 comprised of a thermoelectric module 2, a power supplying section 20 for supplying electric power to various electronic elements including the microprocessor 30 and the thermoelectric module 2, a load driving section 60 for driving the load 80 according to the control signal from the microprocessor 30, a temperature sensing section 90 for sensing the interior temperature of the chamber 7 and then transmitting it to the microprocessor 30, a key input section 50 receiving various functions such as a fermentation speed, fermentation degree, the kind of Kimchi from the user, a displaying section 100 for visually displaying the operation state of the apparatus, and a malfunction preventing section 70 for preventing the damages of the electronic elements due to a malfunction of the microprocessor 30. In the aforementioned configuration, the microprocessor 30 previously stores data for fermentation temperature and time interval corresponding to the respective function as follows: 68°–77° F. and 40 hours for a normal fermentation; 95° F. and 30 hours for a rapid fermentation; 68°–77° F. and 35 hours for a under-fermentation; 68°–77° F. and 45 hours for an over-fermentation. When simple storage is selected, the chamber 7 is maintained at 33.8° F. Furthermore, the aforementioned data are varied according to the kind of Kimchi.

Figure 4:
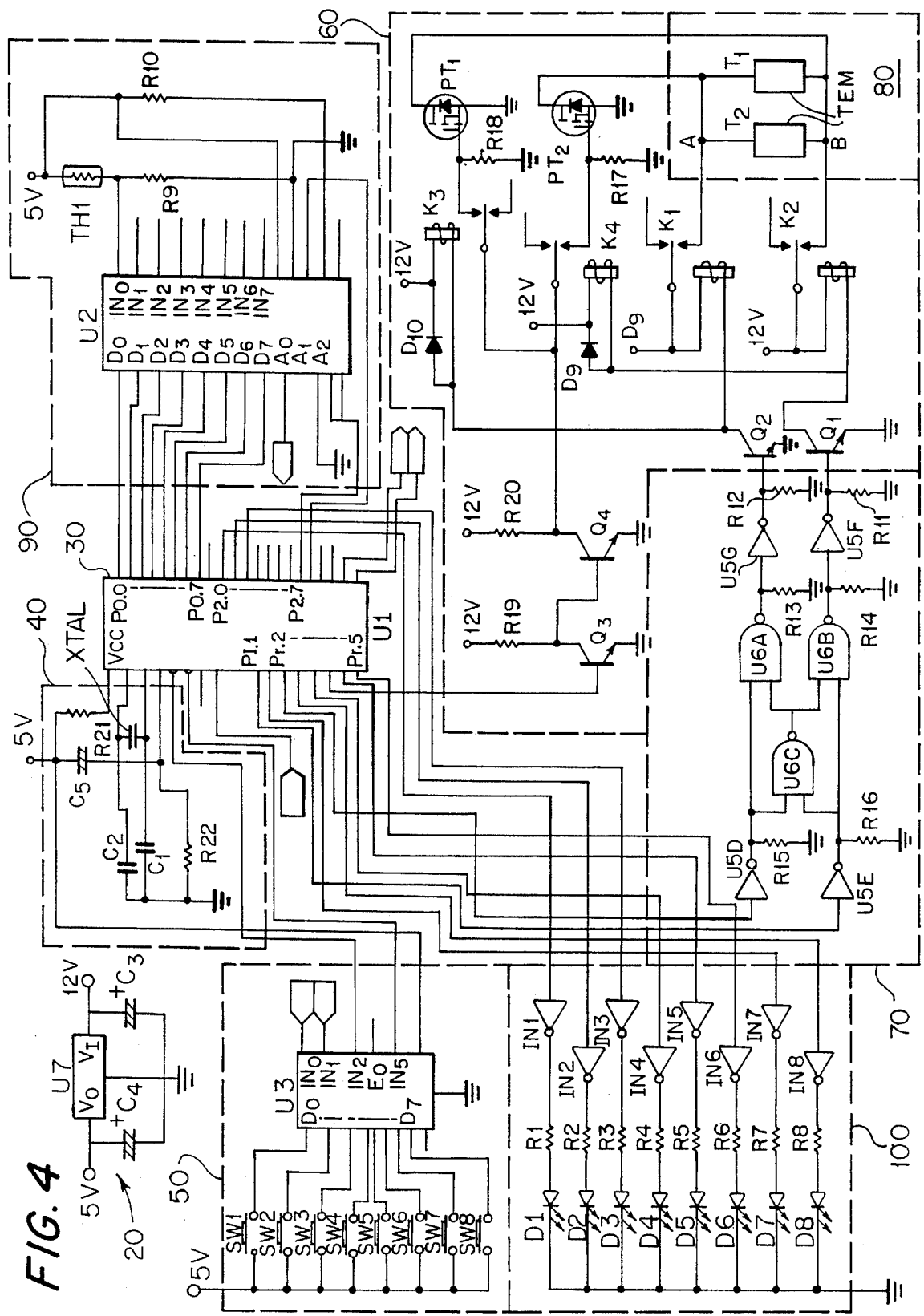

FIGS. 4 is a concrete circuit diagram of a Kimchi fermentation or cool storage apparatus which is preferably used in an automobile.

Referring to FIG. 4, the power supplying section 20 includes a voltage regulating IC U7, and smoothing condensers C3 and C4 respectively connected to the input and output ports of the voltage regulating IC U7. The voltage regulating IC U7 converts D.C. 12 V to D.C..5 V, and then supplies D.C. 5 V to various electronic elements including the microprocessor 30, However, D.C. 12 V is directly applied to some elements including the thermoelectric module 2, The clock circuit 40 includes a crystal oscillator XTAL, and peripheral elements C1, C2 and C5. On the other hand, the clock circuit 40 may be incorporated into the microprocessor 30.

The key input section 50 includes a plurality of switches SW1 to SW8 connected in parallel with terminal of 5V, and an encoder IC U3 interposed between the switches SW1 to SW8 and the microprocessor 30. The switches SW1 to SW8 may be respectively used for selecting a normal fermentation, rapid fermentation, under-fermentation, over-fermentation, simple storage, cabbage Kimchi, radish Kimchi, and water Kimchi. The encoder IC U3 converts the function selected by the user to the corresponding digital data to be identified in the microprocessor 30.

The load section 80 includes two thermoelectric modules T1 and T2 connected in parallel with each other. It is needless to say that the number of thermoelectric module may increase considering the volume of the chamber 7. In some embodiments, a fan motor may be added to the load section 80.

The load driving section 60 includes two power transistors PT1 and PT2 respectively connected to the both junctions A and B of the thermoelectric modules T1 and T2, two relay switches K1 and K2 for respectively connecting or disconnecting D.C. 12 V power supply to each junction A or B of the thermoelectric modules T1 and T2, a transistor Q4 for selectively turning the power transistors PT1 and PT2 on or off according to the control signal from the microprocessor 30, two relay switches K3 and K4 for respectively connecting the transistor Q4 with the power transistors PT1 and PT2, and two transistor Q1 and Q2 for turning respectively the relay switches on or off in pairs. In the load driving section 60, resistors R17 to R20, diodes D9 and D10, and the transistors Q3 are provided for securing a stable operation of the load driving section 60.

The temperature sensing section 90 includes a thermistor Th1 being disposed at the interior of the chamber 7, a voltage dividing resistor R9, and an A/D convertor IC U2 for converting the analog voltage applied to the junction of the thermistor Th1 and the resistor R9 to the corresponding digital data. Resistor R10 is provided for setting reference voltage of the A/D convertor IC U9.

The displaying section 100 includes a plurality of light emitting diodes D1 to D8 respectively connected to the corresponding terminals of the microprocessor 30 via respective invertor gates IN1 to IN8. In the displaying section 100, resistors R1 to R8 are respectively provided for limiting current.

The malfunction preventing section 70 includes invertor gates U5D and U5E whose respective input terminal is connected to the output terminals P1.0 and P1.2 of the microprocessor 30, a NAND gate U6C whose input terminals are connected to the respective output terminal of the invertor gates U5D and U5E, NAND gates U6A and U6B whose one input terminals are connected to the respective output terminal of the invertor gates U5D and U5E, and other input terminals are commonly connected to the output terminal of the NAND gate U6C, invertor gates U5G and U5F whose input terminals are respectively connected to the output terminals of the NAND gates U6A and U6B, and output terminals are respectively connected to the base of the transistors Q1 and Q2. In the malfunction preventing section 70, resistors R11 to R16 are provided for secure operations of the logic gates thereof.

Hereinafter, the operation of the Kimchi fermentation/cool storage apparatus will be explained in detail.

Initially, if the user turns a power switch (not shown) on, electric power is supplied to each part of the apparatus. Next, if the user selects a wanted function, the encoder IC U3 converts it to the corresponding digital data, then transmits them to the microprocessor 30. Next, the user may initially select the kind of Kimchi to be fermented through the switches Sw6 to SW8, and then select a wanted fermentation speed or degree. Let assume the user select a cabbage Kimchi and normal fermentation. At this time, the microprocessor 30 reads out the fermentation temperature and time interval, for example 68°–77° F. and 40 hours, corresponding to the selected functions from the data table incorporated therein. Next, the microprocessor 30 receives the temperature of the chamber 7 from the temperature sensing section 90, and then compares it to the reference fermentation temperature. In the comparison result, when the temperature of the chamber 7 is lower than the reference fermentation temperature, the microprocessor 30 controls the load driving section 60 to drive the thermoelectric modules T1 and T2, thereby increasing the temperature of the chamber 7 to the reference fermentation temperature. More in detail, the microprocessor 30 initially outputs a control signal to the transistor Q2 to be turned on through the terminal P1.0 thereof. As the transistor Q2 is turned on, the relay switches K1 and K2 are activated, thereby connecting the power output voltage of 12 V to the junction A of the thermoelectric modules T1 and T2, and connecting the transistor Q4 to the power transistor PT1. In this state, if the microprocessor 30 outputs a control signal with high level to the transistor Q3 through the terminal P1.5 thereof, the transistor Q3 is turned on, whereas the transistor Q4 is turned off. As the transistor Q4 is turned off, the power supply voltage of 12V is applied to the power transistor PT1 via the relay switch K3, thereby causing the power transistors PT1 to be turned on. Finally, some current flows through the thermoelectric modules T1 and T2, thereby causing the chamber 7 to be heated by the heat generated from a surface of the thermoelectric modules T1 and T2.

On the other hand, when the temperature of the chamber 7 is higher than the reference fermentation temperature, the microprocessor 30 controls the transistor Q1 and relay switches K1 and K2 to be turned on, thereby causing the power supply voltage of 12V to be applied to the other junction B of the thermoelectric modules T1 and T2. Moreover, the power transistors PT2 is turned on, thereby causing current to reversely flow through the thermoelectric modules T1 and T2. Thus, the afore-mentioned surface of the thermoelectric modules T1 and T2 is cooled, thereby decreasing the temperature of the chamber 7.

If 40 hours passes by in the state the temperature of the chamber 7 is maintained at 68°–77° F. by repeatedly performing the afore-mentioned operations, the fermentation process is terminated.

After the termination process is terminated, the storage process is automatically started. The storage process is performed by maintaining the chamber 7 at about 33.8° F.

The remaining functions may be also controlled by the same manner as described above, except for the fermentation temperature and time interval. Furthermore, if the user selects the simple storage, the storage process is directly performed without the fermentation process.

During performing either fermentation or cool storage, it is preferable to forcibly discharge unnecessary heat generated from the other surface of the thermoelectric modules T1 and T2 by a fan motor, thereby increasing cooling efficiency.

While a specified function is performed, a light emitting diode of the displaying section 100 is turned on to display what the specified function is in operation.

On the other hand, if the microprocessor 30 simultaneously produces both heating and cooling control signals due to unexpected malfunction, the thermoelectric modules T1 and T2 and the power transistors PT1 and PT2 may be damaged. The malfunction preventing section 70 is provided for preventing the circuit components from being damaged. More in detail, when the microprocessor 30 concurrently produces both the heating and cooling control signals, the malfunction preventing section 70 forcibly turns the transistors Q1 and Q2 off. Accordingly, the relay switches K1 and K2 are turned off, thereby disconnecting both the junctions A and B of the thermoelectric modules T1 and T2 from power supply voltage of 12 V.

Not shown, by further providing a temperature sensing section for sensing the exterior temperature of the chamber 7, the microprocessor 30 may calculate a difference between the interior and reference temperatures and a difference between the interior and exterior temperature, and then vary the electric power supplied to, the thermoelectric modules T1 and T2 based on the differences.

Furthermore, if a means for converting commercial A.C. power supply to D.C. power supply is further provided, the Kimchi fermentation/cool storage apparatus according to the invention may be used in the house.

While in the foregoing specification a detailed description of an embodiment of the invention has been set down for the purpose of illustration, many variations in the details herein given may be made by those skilled in the art without departing from the spirit and scope of the invention.

I claim:

1. A food fermentation or cool storage apparatus comprising:
   - a chamber for either fermenting or coolly storing foods, said chamber being formed of a hollow barrel with opened upper end;
   - a cover for entering or enclosing said chamber;
   - a thermoelectric means for heating or cooling said chamber, said thermoelectric means being mounted on the outside of the bottom wall of said chamber;
   - a means for supplying electric power with said thermoelectric means;
   - a means for sensing the interior temperature of said chamber; and,
   - a means for receiving the temperature signal from said temperature sensing means, for controlling said power supplying means to keep said chamber at a reference fermentation temperature for a predetermined time duration while fermenting foods, and keep said chamber at a reference storage temperature while coolly storing foods.

2. The food fermentation or cool storage apparatus according to claim 1, in which the food is Kimchi.

3. The food fermentation or cool storage apparatus according to claim 2, further comprising a heat conducting member for evenly conducting the heat generated from said thermoelectric means to the bottom wall of said chamber, said heat conducting member being interposed between the bottom wall of said chamber and said thermoelectric means.

4. The food fermentation or cool storage apparatus according to claim 3, in which silicon compound is stuffed between said thermoelectric means and said heat conducting member to further close adhesion therebetween.

5. The food fermentation or cool storage apparatus according to claim 3, in which a heat insulation member is wound around the peripheral surface of heat conducting member.

6. The food fermentation or cool storage apparatus according to claim 2, in which the exterior surface of said chamber is sheathed with a heat insulation member.

7. The food fermentation or cool storage apparatus according to claim 2, in which a heat radiating plate is attached to the opposite surface of said thermoelectric means to further the radiation of unwanted heat.

8. The food fermentation or cool storage apparatus according to claim 7, further comprising a fan means for forcibly discharging unwanted heat generated from the opposite surface of said thermoelectric means, said fan means being arranged in the vicinity of said heat radiating plate.

9. The food fermentation or cool storage apparatus according to claim 2, in which said apparatus further comprises a means for selecting at least two different fermentation speeds, and said control means controls said power supplying means based on a reference fermentation temperature and time duration corresponding to the respective fermentation speed.

10. The food fermentation or cool storage apparatus according to claim 2, in which said apparatus further comprises a means for selecting at least two different fermentation levels, and said control means controls said power supplying means based on a reference fermentation temperature and time duration corresponding to the respective fermentation level.

11. The food fermentation or cool storage apparatus according to claim 2, in which said apparatus further comprises a means for selecting at least two different kind of Kimchi, and said control means controls said power supplying means based on a reference fermentation temperature and time duration corresponding to the respective kind of Kimchi.

12. The food fermentation or cool storage apparatus according to any of claims 9 through 11, in which said apparatus further comprises a means for displaying the operation state of said apparatus.

13. The food fermentation or cool storage apparatus according to claim 2, in which said apparatus further comprises a means for preventing same voltage level from being concurrently applied to both electric terminals of said thermoelectric means.

14. The food fermentation or cool storage apparatus according to claim 2, in which said apparatus further comprises a means for sensing exterior temperature of said chamber, and said control means receives the exterior temperature signal, calculates a difference between the interior and reference temperatures, and a difference between the interior and exterior temperature, and then controls said power supplying means to vary the electric power supplied to said thermoelectric means based on said differences.

15. The food fermentation or cool storage apparatus according to claim 2, in which said apparatus is adapted to an automobile.

* * * * *